United States Patent
Liu et al.

(10) Patent No.: US 10,036,213 B2
(45) Date of Patent: Jul. 31, 2018

(54) CONNECTION STRUCTURE BETWEEN PIPE BODY AND JOINT OF ALUMINUM ALLOY DRILL PIPE

(71) Applicants: China National Petroleum Corporation, Beijing (CN); CNPC Tubular Goods Research Institute, Xi an, Shan Xi (CN)

(72) Inventors: Yonggang Liu, Beijing (CN); Fangpo Li, Beijing (CN); Xiaojun Li, Beijing (CN)

(73) Assignees: China National Petroleum Corporation, Beijing (CN); CNPC Tubular Goods Research Institute, Xi an, Shan Xi (CN)

( * ) Notice: Subject to any disclaimer, the term of this patent is extended or adjusted under 35 U.S.C. 154(b) by 403 days.

(21) Appl. No.: 14/933,344

(22) Filed: Nov. 5, 2015

(65) Prior Publication Data

US 2016/0161030 A1   Jun. 9, 2016

(30) Foreign Application Priority Data

Dec. 5, 2014   (CN) .......................... 2014 1 0741913

(51) Int. Cl.
  *F16L 15/06*   (2006.01)
  *E21B 17/042*   (2006.01)

(52) U.S. Cl.
  CPC ............ *E21B 17/042* (2013.01); *F16L 15/06* (2013.01)

(58) Field of Classification Search
  CPC ..................................................... F16L 15/06
  (Continued)

(56) References Cited

U.S. PATENT DOCUMENTS

RE27,284 E * 2/1972 Hjalsten et al. ...... B23B 31/005
                                                    285/334
4,171,012 A * 10/1979 Holmes ................... F16B 39/30
                                                    411/285

(Continued)

FOREIGN PATENT DOCUMENTS

CN    201265366 Y    7/2009
CN    102900378 A    1/2013
(Continued)

OTHER PUBLICATIONS

Decision of Rejection and English Translation thereof for Chinese Patent Application No. 201410741913.9 dated Nov. 4, 2016, (CNPC-0003-US), 6 pages.

(Continued)

*Primary Examiner* — David Bochna
(74) *Attorney, Agent, or Firm* — Hoffman Warnick LLC

(57) ABSTRACT

A connection structure between a pipe body and a joint of an aluminum alloy drill pipe is provided, and the connection structure comprises a first joint provided with an internal thread section, wherein an internal thread tooth bottom of the internal thread section is an inclined surface; and a second joint provided with an external thread section which is able to be fitted with the internal thread section and has threads of a complete tooth shape, a tooth height of the external thread section being larger than that of the internal thread section. The internal thread tooth bottom is designed as an inclined surface such that an external thread tooth crest is squeezed against the internal thread tooth bottom and plastically deformed along the inclined surface of the tooth bottom during an engagement, so that the engaged threads are self locked to effectively prevent the loosing of the engaged threads.

7 Claims, 2 Drawing Sheets

(58) Field of Classification Search
USPC .......................................................... 285/334
See application file for complete search history.

(56) References Cited

U.S. PATENT DOCUMENTS

| | | | | |
|---|---|---|---|---|
| 4,594,039 | A * | 6/1986 | Witte | F16B 39/30 |
| | | | | 411/311 |
| 4,687,368 | A * | 8/1987 | Eklof | F16L 15/006 |
| | | | | 285/334 |
| 4,799,844 | A | 1/1989 | Chuang | |
| 4,842,466 | A * | 6/1989 | Wheeler | F16B 33/02 |
| | | | | 411/366.3 |
| 5,282,707 | A * | 2/1994 | Palm | F16B 31/02 |
| | | | | 411/311 |
| 5,387,239 | A * | 2/1995 | Bianco | F16B 39/30 |
| | | | | 411/433 |
| 5,785,357 | A | 7/1998 | Foster et al. | |
| 6,454,315 | B1 * | 9/2002 | Yamaguchi | F16L 15/001 |
| | | | | 285/334 |
| 7,997,842 | B2 * | 8/2011 | Diekmeyer | F16B 39/30 |
| | | | | 411/366.1 |
| 2009/0211815 | A1 | 8/2009 | Hall et al. | |
| 2010/0140929 | A1 * | 6/2010 | Nava | F16L 15/06 |
| | | | | 285/333 |
| 2012/0195713 | A1 | 8/2012 | Gu et al. | |

FOREIGN PATENT DOCUMENTS

| | | |
|---|---|---|
| CN | 203097748 U | 7/2013 |
| CN | 203201492 U | 9/2013 |
| CN | 203257339 U | 10/2013 |
| RU | 2205320 C2 | 5/2003 |
| RU | 2508491 C1 | 2/2014 |
| WO | 2012079299 A1 | 6/2012 |
| WO | WO 2012161641 A1 * 11/2012 ............. F16B 33/02 |

OTHER PUBLICATIONS

CN Office Action 2, Application No. 201410741913.9, dated Aug. 2, 2016 and English translation thereof, 6 pages.
First Notification of Office Action and Search Report for CN Application No. 201410741913.9, dated Feb. 3, 2016, 11 pages.
RU Office Action & English Translation thereof for RU Patent Application No. 2015147725 dated Feb. 9, 2017, 10 pages.

* cited by examiner

CONNECTION STRUCTURE BETWEEN PIPE BODY AND JOINT OF ALUMINUM ALLOY DRILL PIPE

This application claims priority to Chinese Patent Application No. 201410741913.9, filed on Dec. 5, 2014 before the State Intellectual Property Office of the P.R.C, which is hereby incorporated by reference in its entirety.

TECHNICAL FIELD

The present disclosure relates to the field of petrochemical equipment, and particularly, to a connection structure between a pipe body and a joint of an aluminum alloy drill pipe, which connection structure is applicable to an all-aluminum alloy drill pipe and an aluminum alloy drill pipe with a steel joint.

BACKGROUND

The aluminum alloy drill pipe has advantages and characteristics such as light dead weight, high mass strength ratio, and anti-fatigue. With the application of special process wells such as super-deep wells, super-long horizontal wells and super-long extended reach wells, and the popularization of downhole power drilling tools, the aluminum alloy drill pipe is used more and more widely. According to related data statistics, in recent years, in the exploration and development of oil and gas resources in Russia, the aluminum alloy drill pipe is used in 70% of wells.

SUMMARY

A connection structure between a pipe body and a joint of an aluminum alloy drill pipe, comprising: a first joint provided with an internal thread section, wherein an internal thread tooth bottom of the internal thread section is an inclined surface; and a second joint provided with an external thread section which is able to be fitted with the internal thread section and has threads of a complete tooth shape, a tooth height of the external thread section being larger than that of the internal thread section.

BRIEF DESCRIPTION OF THE DRAWINGS

The drawings for the Description constitute a part of the present application and are provided for further understanding of the present disclosure. The exemplary embodiments and the descriptions thereof are used to interpret the present disclosure, rather than provide limitations thereto. In which.

LIST OF REFERENCE SIGNS

Figure 1:
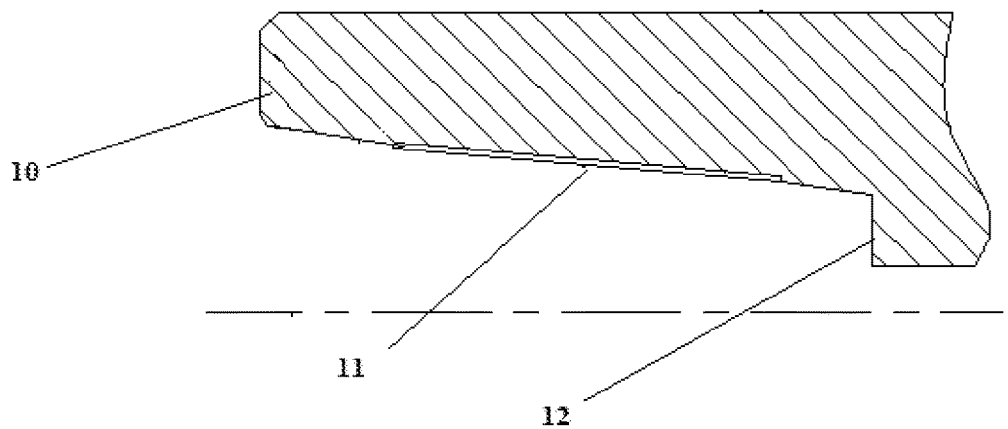
FIG. 1 is a structural diagram of a first joint according to an embodiment of a connection structure between a pipe body and a joint of an aluminum alloy drill pipe in the present disclosure.

10. First Joint; 11. Internal Thread Section; 111. Internal Thread Tooth Bottom; 12. First Seal End Face; 20. Second Joint; 21. External Thread Section; 211. External Thread Tooth Crest; 22. Second Seal End Face.

DESCRIPTION OF EMBODIMENTS

Currently, the aluminum alloy drill pipe has two types of structures. One is an integral all-aluminum alloy drill pipe, i.e., the pipe body and the joint of the entire drill pipe are extrusion-molded from the aluminum alloy pipe body. The other is an aluminum alloy drill pipe with a steel joint, i.e., the pipe body portion is made of aluminum alloy material, while the joint is made of carbon steel and is in threaded connection with the steel joint mainly in the manner of hot assembly. In other words, when the pipe body is to be connected to the joint, firstly the steel joint is heated to expand, and then the heated steel joint is in threaded connection with the aluminum alloy pipe body. After the steel joint is cooled, an interference fit is formed for the threaded connection between the joint and the pipe body through an effect of heat-expansion and cold-contraction of the steel, and a screwing-off torque between the aluminum alloy pipe body and the steel joint is far larger than a screwing-on torque and a working torque therebetween, so that any back-off or loosening of the aluminum alloy drill pipe will never occur in the service process. Alternatively, the aluminum alloy pipe body of the drill pipe may be cooled firstly, and then the cooled pipe body is connected to the steel joint. This principle is the same as the principle that the steel joint is heated and connected to the aluminum alloy pipe body, both for achieving an interference fit between the steel joint and the pipe body after the connection through heat-expansion and cold-contraction of the materials, so as to obtain a higher screwing-off torque as well as connection strength and sealing strength between the aluminum alloy pipe body and the steel joint.

The prior art has the following disadvantages that either the cold assembly or the hot assembly requires special facilities to heat the joint or cool the pipe body. In addition, either the steel joint or the aluminum alloy pipe body requires a high or low temperature state during the assembly. Thus the efficiency of the assembly process is not high.

In order to solve the problem in the prior art that the assembly efficiency is not high, the present disclosure provides a connection structure between a pipe body and a joint of an aluminum alloy drill pipe, so as to achieve the purpose of improving the assembly efficiency.

The present disclosure adopts the following technical solution to solve its technical problem: a connection structure between a pipe body and a joint of an aluminum alloy drill pipe, comprising: a first joint provided with an internal thread section, wherein an internal thread tooth bottom of the internal thread section is an inclined surface; and a second joint provided with an external thread section which is able to be fitted with the internal thread section and has threads of a complete tooth shape, a tooth height of the external thread section being larger than that of the internal thread section.

In one embodiment, an inner bore of the first joint may be tapered; the first joint may have an inlet end, and a diameter of the internal thread tooth bottom may be gradually decreased in a direction far away from the inlet end within the first joint.

In one embodiment, an angle α between the internal thread tooth bottom and an axis of the internal thread section is larger than or equal to 14° and less than or equal to 16°.

In one embodiment, a length of the internal thread section may be equal to that of the external thread section.

In one embodiment, a taper of the internal thread section may be 1:8.

In one embodiment, a material of the internal thread section may have a strength larger than or equal to that of a material of the external thread section.

In one embodiment, the first joint may have a first seal end face, and the second joint may be provided therein with a second seal end face fitted with the first seal end face.

In one embodiment, a taper of the external thread section may be 1:8.

In one embodiment, an external thread tooth crest of the external thread section of the second joint may is of a circular arc shape.

The present disclosure has the following beneficial effect: the internal thread tooth bottom is designed as an inclined surface such that the tooth height of the external thread tooth is larger than that of the internal thread tooth engaged with the external thread tooth, so that the external thread tooth crest is squeezed against the internal thread tooth bottom and plastically deformed along the internal thread tooth bottom during an engagement, so that the engaged threads are self locked to effectively prevent the loosing of the engaged threads. Meanwhile, since the plastic deformation, which is caused by the squeezing between the external thread tooth crest and the internal thread tooth bottom during the engagement, increases the friction area between the crest of the external thread tooth and the bottom of the internal thread tooth, the adherence occurs at the contact area between the external thread tooth crest and the internal thread tooth bottom, which further improves the anti-loosing effect and achieves a higher screwing-off torque. In addition, since the present disclosure does not need to heat or cool the connection structure between the pipe body and the joint of the aluminum alloy drill pipe, the operation is simpler, and the purpose of improving the assembly efficiency can be achieved.

The present disclosure can effectively achieve the expected sealing property and screwing-off torque for the threaded connection between the pipe body and the joint. Meanwhile, due to the double-sealed structure formed of a contact seal between the internal thread tooth bottom and the external thread tooth crest and a fitting between the first seal end face and the second seal end face, the sealing property of the joint is higher.

To be noted, if there is no conflict, the embodiments in the present application can be combined with each other, so do the features in the embodiments. Next, the present disclosure is described in detail with reference to the drawings and in conjunction with the embodiments.

Figure 2:
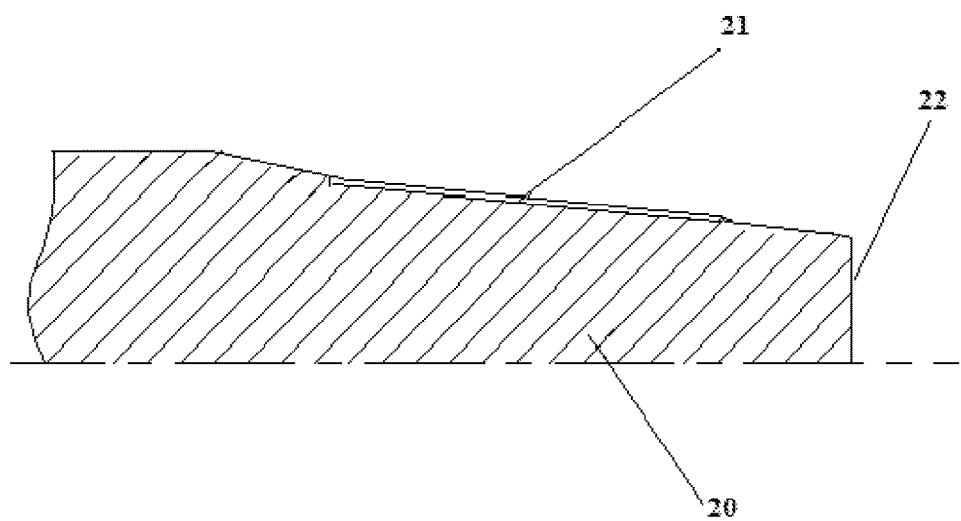
FIG. 2 is a structural diagram of a second joint according to an embodiment of a connection structure between a pipe body and a joint of an aluminum alloy drill pipe in the present disclosure.
Figure 3:
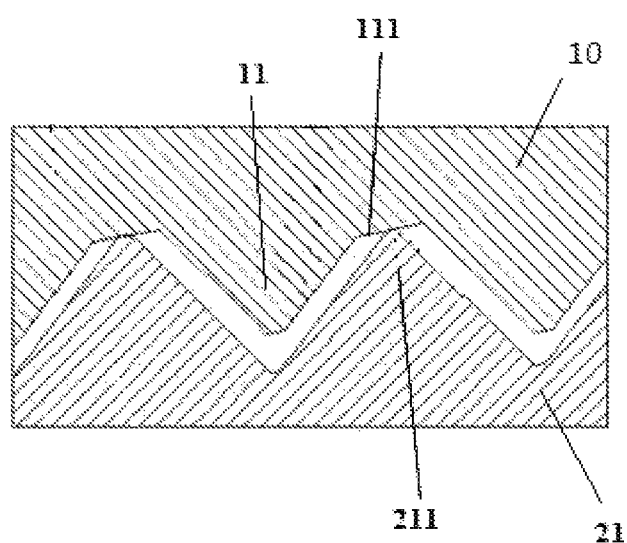
FIG. 3 is a structural diagram of a fitting between an internal thread section and an external thread section according to an embodiment of a connection structure between a pipe body and a joint of an aluminum alloy drill pipe in the present disclosure.

As shown in FIGS. 1 to 3, embodiments of the present disclosure provide a connection structure between a pipe body and a joint of an aluminum alloy drill pipe, comprising a first joint 10 and a second joint 20. The first joint 10 is provided with an internal thread section 11, wherein an internal thread tooth bottom (111) (i.e., a bottom of the internal thread tooth) of the internal thread section (11) is an inclined surface, and the internal thread tooth bottom (111) is a part that connects two adjacent internal thread teeth, the internal thread tooth bottom 111 forming an angle α with an axis of the internal thread section 11. The second joint 20 is provided with an external thread section 21 which is able to be fitted with the internal thread section 11 and has threads of a complete tooth shape. An external thread tooth crest 211 has a circular arc shape, and a tooth height of the external thread section 21 is larger than that of the internal thread section 11.

When the first joint 10 is fitted with the second joint 20, since the tooth height of the external thread section 21 is larger than that of the internal thread section 11, the external thread tooth crest 211 of the external thread section 21 is squeezed against the internal thread tooth bottom 111 of the internal thread section 11 to cause a plastic deformation along the internal thread tooth bottom 111, so that the threaded connection after engagement is self-locked to effectively prevent thread screwing off. Meanwhile, the friction force increases with the increase of the friction area between the external thread tooth crest 211 and the internal thread tooth bottom 111, which causes adherence at the contact area and thread gluing. Thus a higher screwing-off torque is obtained to further improve the anti-loosing effect after a threaded connection, thereby achieving the expected sealing property and screwing-off torque for the threaded connection between the pipe body and the joint. In addition, since the present disclosure does not need to heat or cool the connection structure between the pipe body and the joint of the aluminum alloy drill pipe, special heating or cooling facilities are not required, thus the assembly operation is simpler, and the purpose of improving the assembly efficiency can be achieved.

In the embodiment of the present disclosure, the internal thread section 11 and the external thread section 21 have their parameters matched with each other except that the different structure of the internal thread tooth bottom 111. Thus the internal thread section 11 and the external thread section 21 can be connected to and cooperated with each other.

To be noted, as shown in FIG. 3, the internal thread tooth bottom 111 in the embodiment of the present disclosure is designed as an inclined surface, and the rigidity of the internal thread section 11 is not less than that of the external thread section 21, for the purpose that when the external thread tooth crest 211 is squeezed against and fitted with the internal thread tooth bottom 111, the top of the external thread tooth crest 211 can be plastically deformed along the internal thread tooth bottom 111, so that the contact between the external thread tooth crest 211 and the internal thread tooth bottom 111 is changed from a linear contact into a plane contact, and the engaged threads are self-locked, while the friction force during screwing off is increased, so as to greatly increase the screwing-off torque.

The first joint 10 has an inner bore which is a tapered structure. The first joint 10 has an inlet end, and a diameter of the internal thread tooth bottom 111 is gradually decreased in a direction far away from the inlet end within the first joint 10.

The first joint 10 has a first seal end face 12 therein, and the second joint 20 is provided therein with a second seal end face 22 fitted with the first seal end face 12. A contact seal between the internal thread tooth bottom 111 and the external thread tooth crest 211, and fit between the first seal end face 12 and the second seal end face 22 provide a double-sealed structure, so that the sealing property of the connection structure is higher.

In the embodiment of the present disclosure, the internal thread section 11 may be made of carbon steel or aluminum alloy, and the external thread section 21 is made of aluminum alloy.

Preferably, the angle α between the internal thread tooth bottom 111 and the axis of the internal thread section 11 is larger than or equal to 14° and less than or equal to 16°.

The friction force between the external thread tooth crest 211 and the internal thread tooth bottom 111 can be changed by varying the magnitude of the angle α, so as to influence the self locking effect after the threaded connection. When the angle α falls within the above range, the external thread tooth crest 211 not only effectively realizes a self locking of the engaged threads, but also effectively ensures the connection strength of the whole threads. In the embodiment of the present disclosure, the self locking effect and the connection strength of the threaded connection are the optimum when the angle α=15°.

Preferably, the internal thread section 11 in the embodiment of the present disclosure is a tapered thread section having long knuckle threads, with a pitch of 6 teeth per inch, and a taper of 1:8. The tapered thread section has a length of 105 mm. The pitch, taper and thread length of the external thread section 21 are the same as those of the internal thread section 11.

When the connection structure between the pipe body and the joint of the aluminum alloy drill pipe according to the embodiment of the present disclosure is used in the assembly, the second joint 20 is screwed via the inlet end of the first joint 10, so that the internal thread section 11 is fitted with the external thread section 21. The second joint 20 is screwed until the second seal end face 22 of the second joint 20 and the first seal end face 12 of the first joint 10 are in contact witch and squeezed against each other so that the screwing-on torque reaches an expected torque value. In the process of screwing the second joint, due to different tooth heights, the external thread tooth crest 211 is squeezed against the internal thread tooth bottom 111 to be plastically deformed along the inclined surface of the internal thread tooth bottom 111, so that the contact between the top of the external thread tooth crest 211 and the internal thread tooth bottom 111 is changed from a linear contact into a plane contact, and the friction force is increased, thereby realizing the anti-loosing self-locking function of the threaded connection.

Moreover, due to the plastic deformation of the external thread tooth crest 211, the adherence occurs at the contact area between the top of the external thread tooth crest 211 and the internal thread tooth bottom 111, and the screwing-off torque of the threaded connection is still increased, which further achieves the anti-loosing self-locking function of the threaded connection.

To be noted, when the connection structure between the pipe body and the joint of the aluminum alloy drill pipe according to the embodiment of the present disclosure is applied, the screwing-off torque can be greatly increased. Experiments show that the screwing-off torque of the connection structure between the pipe body and the joint of the aluminum alloy drill pipe according to the embodiment of the present disclosure is 1.5 to 2 times more than the screwing-on torque thereof.

As can be seen from the above descriptions, the embodiment of the present disclosure achieves the following technical effect: the angle of the inclined surface of the internal thread tooth bottom is designed such that the tooth height of the external thread teeth is larger than that of the internal thread teeth engaged with external thread teeth. During the engagement, the external thread tooth crests are squeezed against the internal thread tooth bottoms and plastically deformed along the inclined surfaces of the tooth bottoms, so that the engaged threads are self locked to effectively prevent the loosing of the engaged threads. Meanwhile, since the plastic deformation, which is caused by the squeezing between the external thread teeth crests and the internal thread tooth bottoms during the engagement, increases the friction area between the external thread tooth crests and the internal thread tooth bottoms, the adherence occurs at the contact area between the external thread tooth crests and the internal thread tooth bottoms, which further improves the anti-loosing effect and achieves a higher screwing-off torque.

In addition, a contact seal between the internal thread tooth bottom and the external thread tooth crest and a fit between the first seal end face and the second seal end face provide a double-sealed structure, so that the sealing property of the joint is higher. The present disclosure effectively achieves the expected sealing property and screwing-off torque for the threaded connection between the pipe body and the joint. In addition, since the present disclosure does not need to heat or cool the connection structure between the pipe body and the joint of the aluminum alloy drill pipe, the operation is simpler, and the purpose of improving the assembly efficiency can be achieved.

The above description of the preferred embodiments of the present disclosure is illustrative, and cannot be used to limit the present disclosure. As known to a person skilled in the art, the prevent disclosure may have various modifications and changes. Any amendment, equivalent replacement, improvement, etc. made under the spirit and principle of the present disclosure shall be covered by the protection scope of the present disclosure.

What is claimed is:

1. A connection structure between a pipe body and a joint of an aluminum alloy drill pipe, comprising:
   a first joint provided with an internal thread section, wherein an internal thread tooth bottom of the internal thread section is an inclined surface; and
   a second joint provided with an external thread section which is able to be fitted with the internal thread section and has threads of a complete tooth shape, a tooth height of the external thread section being larger than that of the internal thread section,
   wherein an inner bore of the first joint is tapered, the first joint has an inlet end, and a diameter of the internal thread tooth bottom is gradually decreased in a direction away from the inlet end within the first joint; and
   wherein an angle α between the internal thread tooth bottom and an axis of the internal thread section is larger than or equal to 14° and less than or equal to 16°.

2. The connection structure between the pipe body and the joint of the aluminum alloy drill pipe according to claim 1, wherein a length of the internal thread section is equal to that of the external thread section.

3. The connection structure between the pipe body and the joint of the aluminum alloy drill pipe according to claim 2, wherein a taper of the internal thread section is 1:8.

4. The connection structure between the pipe body and the joint of the aluminum alloy drill pipe according to claim 1, wherein a material of the internal thread section has a strength larger than or equal to that of a material of the external thread section.

5. The connection structure between the pipe body and the joint of the aluminum alloy drill pipe according to claim 1, wherein the first joint has a first seal end face, and the second joint is provided therein with a second seal end face fitted with the first seal end face.

6. The connection structure between the pipe body and the joint of the aluminum alloy drill pipe according to claim 1, wherein a taper of the external thread section is 1:8.

7. The connection structure between the pipe body and the joint of the aluminum alloy drill pipe according to claim 6, wherein an external thread tooth crest of the external thread section of the second joint is of a circular arc shape.

* * * * *